Oct. 8, 1963
A. NOVICK
3,106,121
ROTARY PANEL CUTTER
Filed May 19, 1959
5 Sheets-Sheet 1
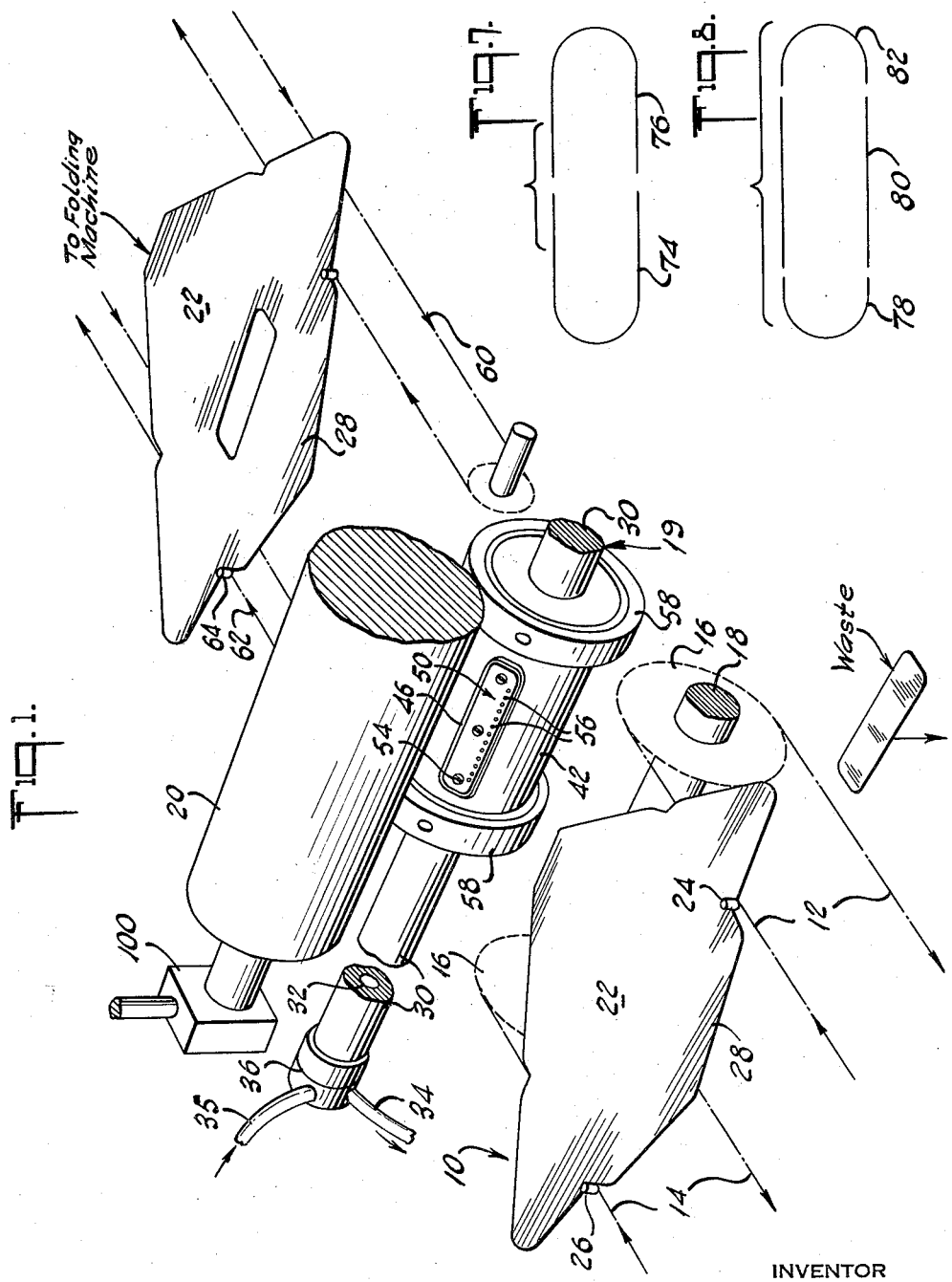
INVENTOR
*ABRAHAM NOVICK*
BY
*Moses, Nolte, & Nolte*
ATTORNEYS

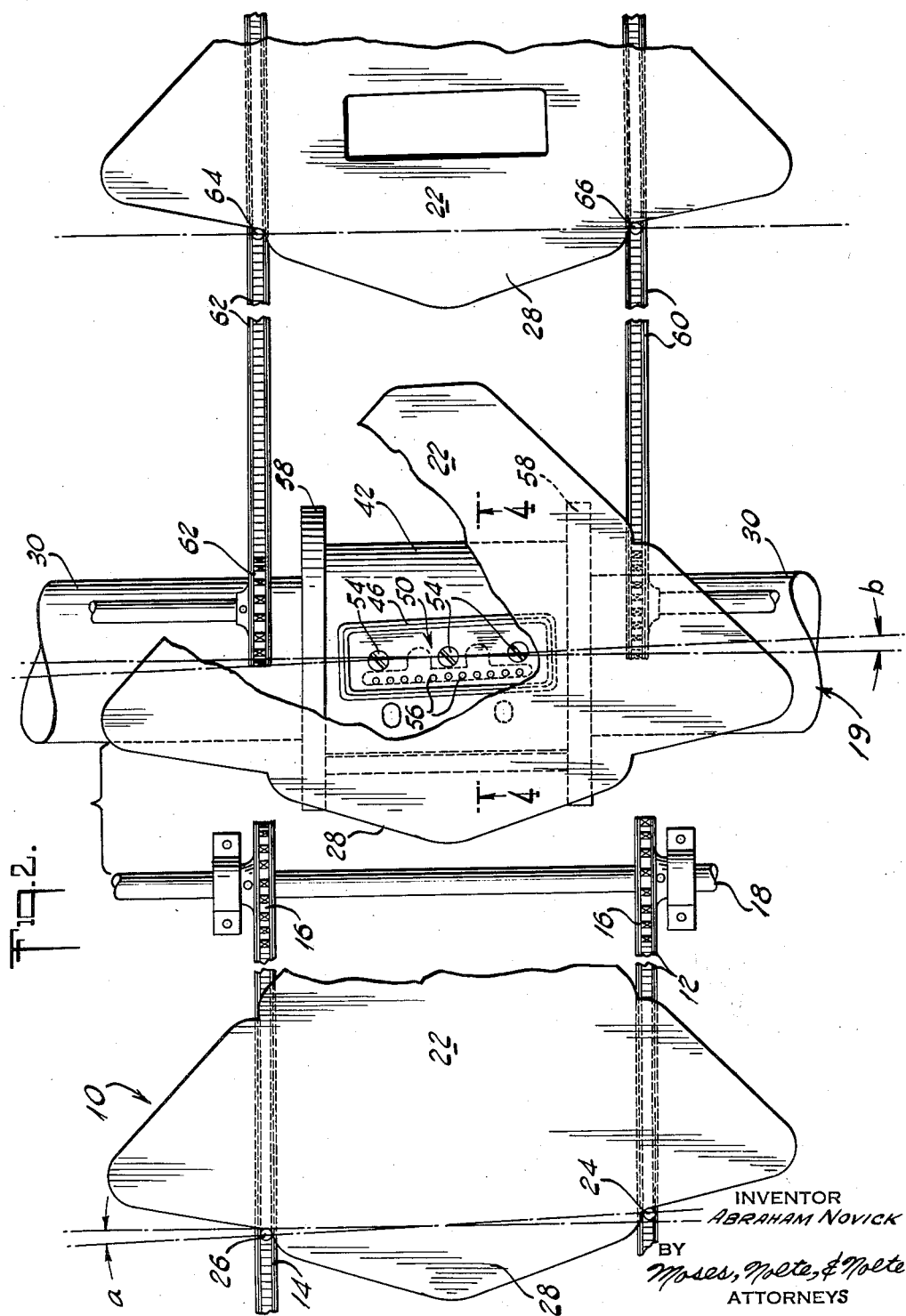

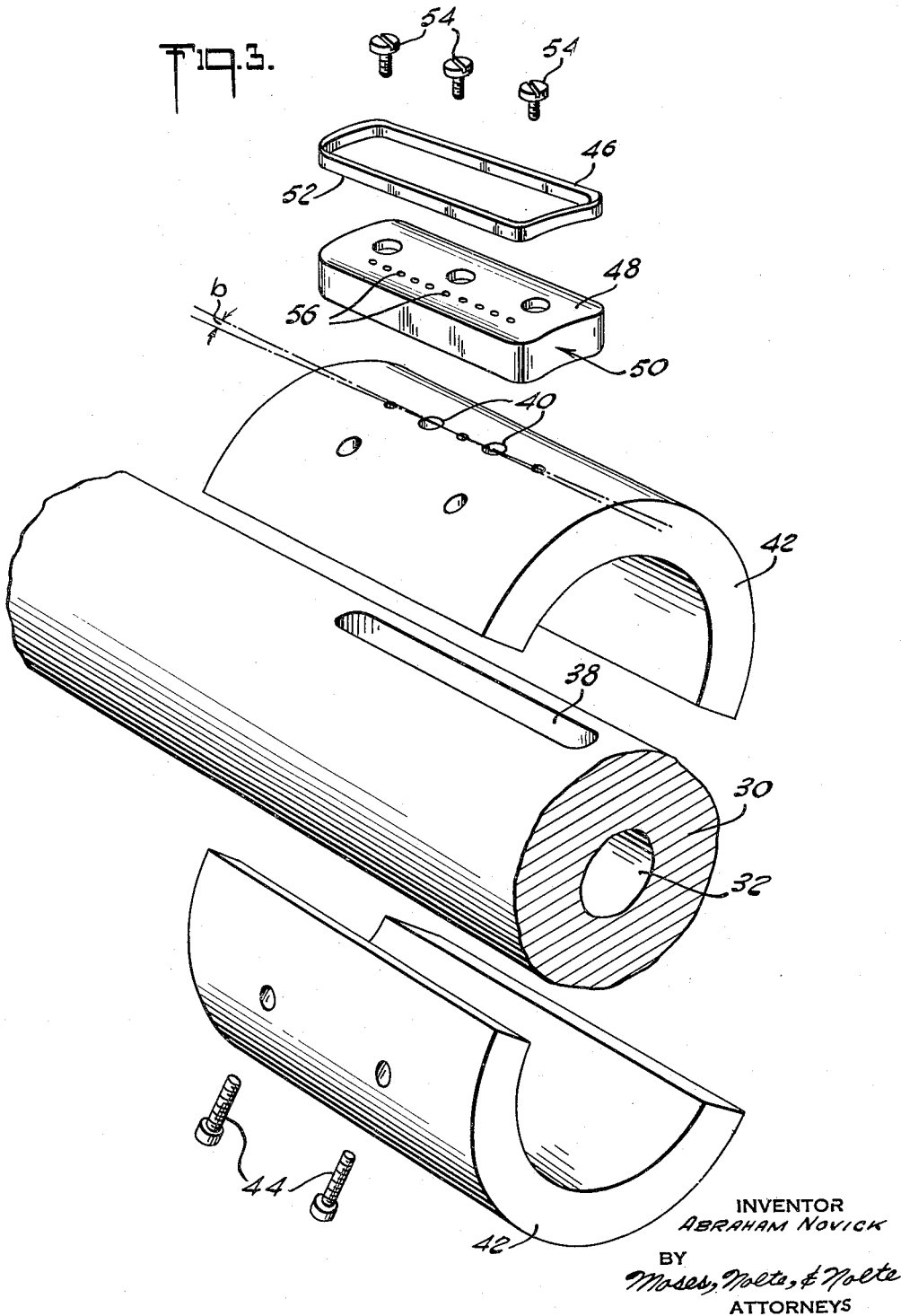

Oct. 8, 1963  A. NOVICK  3,106,121
ROTARY PANEL CUTTER
Filed May 19, 1959  5 Sheets-Sheet 4
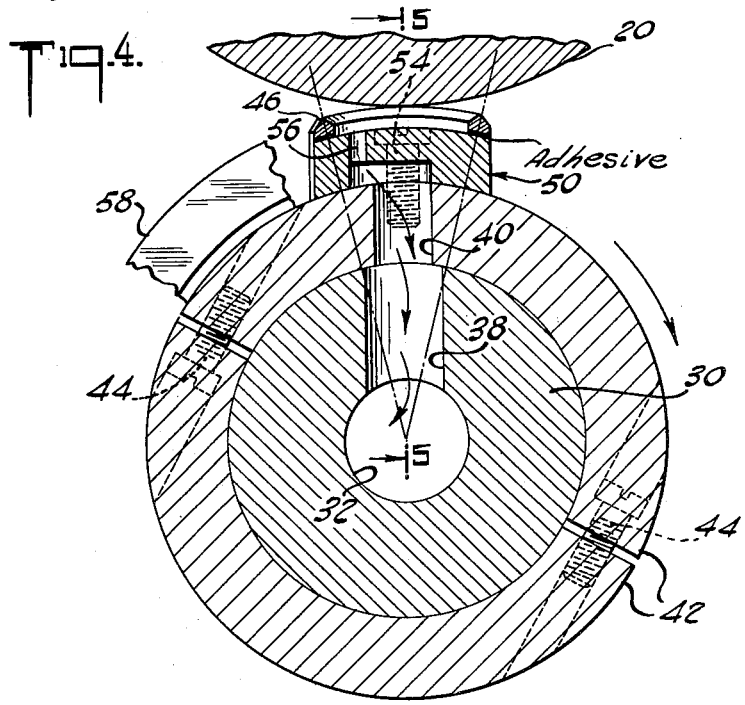
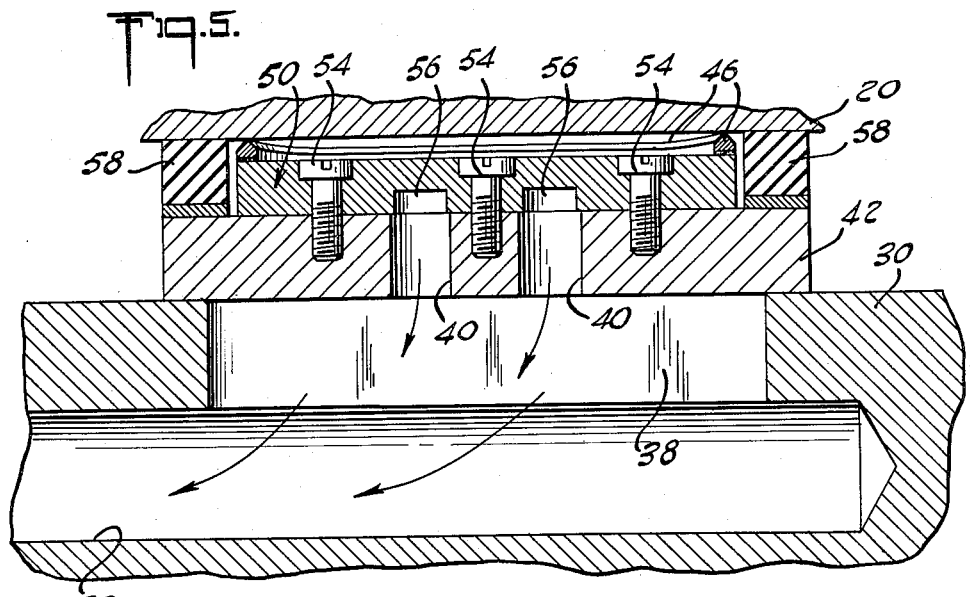
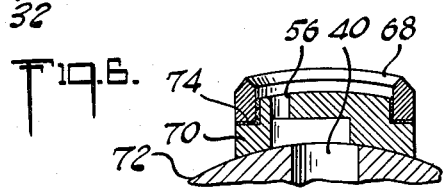
INVENTOR
ABRAHAM NOVICK
BY
Moses, Nolte, & Nolte
ATTORNEYS

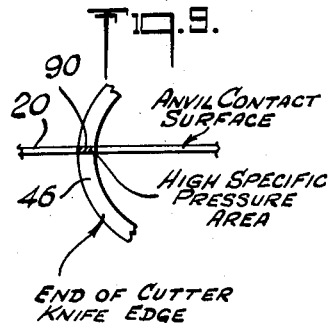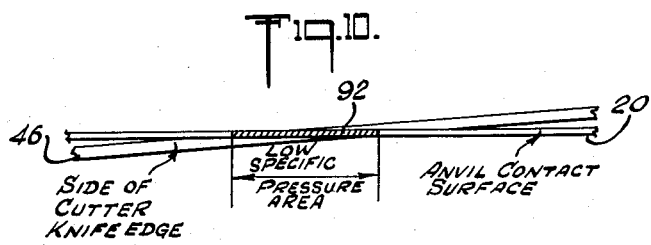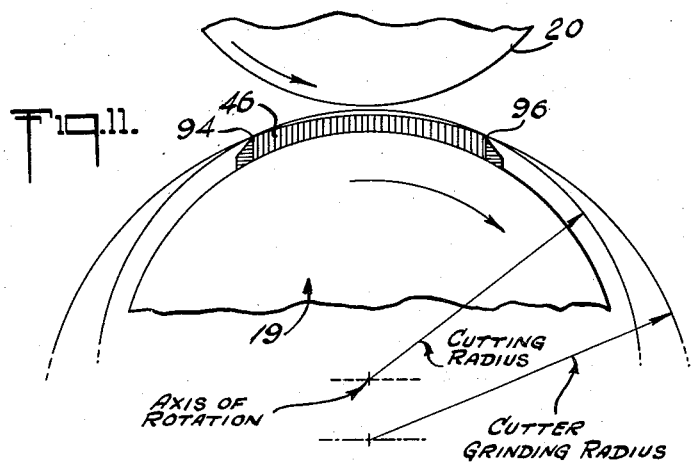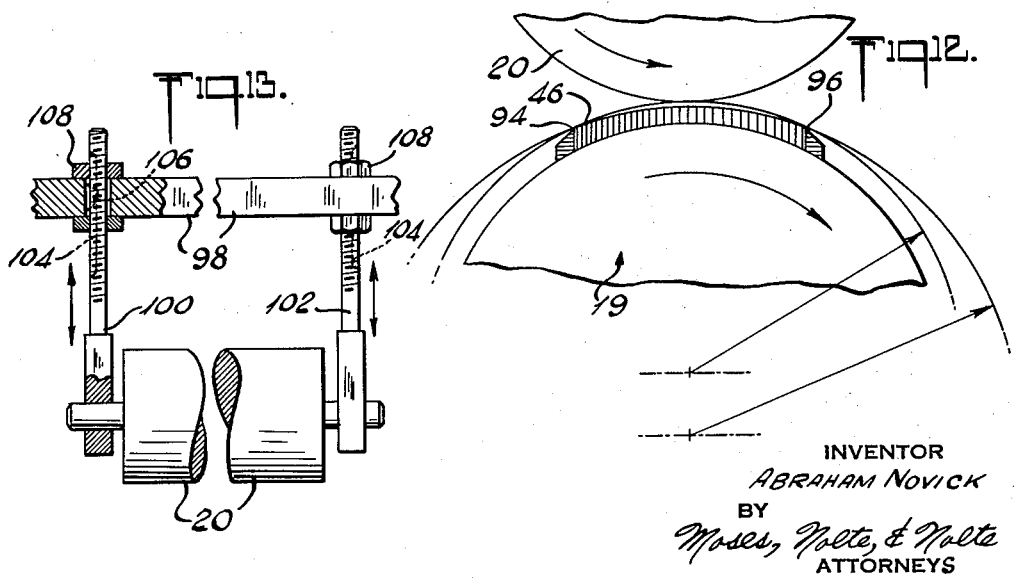

United States Patent Office 3,106,121
Patented Oct. 8, 1963

3,106,121
ROTARY PANEL CUTTER
Abraham Novick, Flushing, N.Y., assignor to F. L. Smithe Machine Company, Inc., New York, N.Y., a corporation of New York
Filed May 19, 1959, Ser. No. 814,205
13 Claims. (Cl. 83—152)

This invention relates in general to rotary panel cutters and particularly to a new and useful device for cutting out a panel section of a web material and to a new and useful machine for delivering blanks in accurately and useful spaced sequence into association with a panel cutter for cutting away a panel area of material from such blanks.

The present invention is particularly concerned with the manufacture of envelope blanks in which blanks are advanced in succession into association with panel cutting mechanism for accurately cutting away a rectangular panel "window" in each blank as it is advanced into association with the panel cutters. The present invention is an improvement over devices of this character particularly in connection with the mechanism for accurately aligning the envelope blanks for their controlled feeding into association with the panel cutting mechanism wherein the timing arrangement is such that the blanks may be fed at a slight angle from the center line of the rotary panel cutter. The panel cutting knife itself being arranged at a correspondingly offset angle so that each blank is cut by a shearing action as it is advanced through the cutter. The resulting material which is removed from the blank is a substantially rectangular panel which is cut away from a central area of the blank.

A feature of the present invention is the construction of panel cutter in which the cutting blade is mounted on detachable shell portions which cover a rotary vacuum cylinder. The cutting blades are accurately aligned so that the knife edges make a radial cut into the blanks as they are revolved around the vacuum cylinder. Since the cutting knife itself is easily disassembled from the vacuum cylinder, the size and configuration of the panel which is cut from the blank may be varied without a major adjustment. In one embodiment of the invention the blades are mounted on a curved raised section which is affixed to the vacuum carrying cylinder in a manner to insure that the knife edges of the blade are aligned along a radial line drawn from the center of the vacuum carrying cylinder. In another embodiment of the invention the cutting blades are mounted on a flat surface of a raised projection but the laterally spaced portions of the blades are sufficiently close together and the knife is shaped so that the knife edges of the blade cut each into the blank at substantially a radial cutting line. In each embodiment material which is cut away from the blank is held by vacuum controlled by the vacuum carrying cylinder so that the waste material is lifted away from the blank and then released during the remaining portion of the revolution of the cylinder into alignment with a waste container.

A further feature of the invention is the precision grinding of the panel knife by grinding along a very large diameter grinding radius measured from a point central of the elongated sides to achieve a slight undercutting of the two ends of the panel knife in relation to the cutting of the sides of the panel knife. This is of primary importance when the panel cutting knife is of substantial elongation such as five inches or more.

The panel knife is set off at an angle to the axis of rotation of its mounting roller in order to achieve a shearing cut of the blank as it is advanced between the panel cutting knife and a cooperating roller. With previous knife constructions there develops a high specific pressure area at each end. This is true because the cutting knives were ground by grinding along the radius of rotation of the mounting cylinder which produces a knife of uniform dimensions measured from the axis of rotation. However, since there is usually point contact of the knife with a blank at each end of the panel cutter but extended line contact of the knife and blank at each side of the panel cutter, the ends are subjected to much greater stress than the sides and any misalignment of the knife or mounting cylinder is apt to cause failure of the knife at the ends.

By grinding the panel cutting knife on a radius much larger than the radius between the axis of rotation of the panel cutter and the edge of the blade, it is possible to make the ends of the panel cutting knives of slightly less outward extension than the sides. The grinding cut in accordance with the invention is made so that there is less clearance between the tip of the panel cutting knife edge and the backing roller anvil both at the ends and the sides of the knife than the thickness of a blank being passed therethrough. The ends of the panel cutting knife, however, are made to clear the anvil to a greater extent than the sides to lessen the likelihood of damage of these high pressure contact end areas. It is not necessary that the clearance between any part of the knife and the anvil backing roller be reduced to zero in order to sever the panel from the envelope blank.

Accordingly, it is an object of this invention to provide an improved rotary panel cutter.

A further object of this invention is to provide a rotary panel cutter in which the cutting blades are arranged askew from the center of the line of feed of blanks being processed thereby in order to effect a shearing cut of each blank as it is advanced into association therewith and including mechanism for positioning the envelopes in relation to the center of the feed line so that the panel cut away therefrom is accurately centered and aligned in respect to the blank.

A further object of this invention is to provide a rotary panel cutter including a waste material vacuum controlled cylinder upon which two separable half-shelled portions are mounted and on one of said shell portions there is mounted a panel cutting knife, the latter being affixed to or integral with a curved block piece at a location and arrangement to present a curved knife cutting edge which is in alignment with a radial line extending from said vacuum carrying cylinder.

A further object of this invention is to provide a panel cutter which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary perspective view of a portion of an envelope making machine indicating mechanism for cutting windows out of envelope blanks in accordance with the invention;

FIG. 2 is a top plan view of the mechanism indicated in FIG. 1;

FIG. 3 is a fragmentary exploded perspective view of the panel cutting mechanism constructed in accordance with the invention;

FIG. 4 is a vertical section taken on a line 4—4 of FIG. 2;

FIG. 5 is a fragmentary vertical section taken on a line 5—5 of FIG. 4;

FIG. 6 is a fragmentary vertical section similar to FIG. 5 indicating another embodiment of panel cutter;

FIGS. 7 and 8 indicate embodiments of panel cutter knife constructions;

FIG. 9 is a greatly magnified schematic view indicating the small area of contact made by the end of the panel cutting knife and the backing roller;

FIG. 10 is a view similar to FIG. 9 but indicating the elongated line low pressure contacting area of the panel cutting knife and the backing roller at the sides of the panel cutter;

FIG. 11 is a somewhat schematic transverse section of the panel cutter and mounting roller and the backing roller anvil indicating schematically how the panel cutter is ground along a radius much larger than the radius from the center of the panel cutter roller to the edge of the panel cutting knife with the anvil roller in a position at which the sides of the cutting knife are close enough to cut a paper blank but the ends are not;

FIG. 12 is a view similar to FIG. 11 but indicating the anvil backing roller in an operating position at which it is lowered to a position minutely spaced from the sides of the panel cutting knife during the latter's rotation and sufficiently close to effect severing of a blank around the complete periphery of the knife; and FIG. 13 is a fragmentary elevational and sectional view of the backing roller anvil mounting construction.

Referring to the drawings in particular the invention as embodied therein includes a portion of an envelope making machine generally designated 10 including spaced chain belt conveyors 12 and 14 which extend over laterally spaced sprockets 16, 16 rotatably mounted on a shaft 18. The conveyors 12 and 14 are continuously advanced in a direction toward a lower rotary panel cutting mechanism 19, and an upper cooperating backing roller 20 to cut window panels of envelope blanks generally designated 22. The sprocket chains 12 and 14 are provided with upstanding aligning pins 24 and 26 which move behind the lateral edges of a trailing sealing flap 28 of the blank 22 and accurately align each blank prior to its movement into association with the panel cutting mechanism 19. The aligning pins are arranged to feed the blanks at a small angle $a$ from a perpendicular to the direction of feed.

In accordance with the invention the panel cutting mechanism includes a central vacuum and pressure controlled supporting cylinder 30 which has a hollowed central portion 32 which communicates through a tube 34 to a source of negative pressure or vacuum (not shown) and a tube 35 to a source of positive pressure (not shown). One end of the hollow cylinder 30 is provided with a well known rotary valve mechanism 36 to interrupt the communication between the bore 32 and the respective tubes 34 and 35 and hence controls the periods at which the central bore 32 is subjected to either negative or positive pressure. The central bore 32 leads through radial passage 38 and small openings 40 in one of a pair of panel cutting mounting shells 42. The shells 42 are aligned in position over the cylinder 30 and clamped thereon as by bolts 44.

In the embodiments illustrated in FIGS. 1 to 5 inclusive the panel cutting knife includes a continuous rectangular blade 46 which is positioned on a curved surface 48 of a mounting block generally designated 50. The curved surface 48, the cooperating under surface 52 of the panel cutting blade 46, and the outer surface of the cylinder 30 are each concentric with the axis of the cylinder. This insures that the knife edge of the blade 46 will be positioned along a radial line extending outwardly from the center of rotation thereof. The panel cutting blade 46 is secured to the block 50 as by adhesive and the block is secured to the shell 42 by means of bolts 54. The axes of the block 50 and the knife 46 are offset in respect to the axis of the cylinder 30. The holes 40 in the shell 42 communicate with small openings 56 and ports in the block 50 so that at the proper interval vacuum is applied to the area inside the rectangular cutting blade 46.

The panel cutting knife blade 46 is offset from a perpendicular to the feed line in the same direction as the offset feeding of the blank 10 by an angle $b$ equal to the angle $a$ (FIG. 2) in order to effect a shearing cut of the blank and to properly align the panel which is cut out of the blank.

When each blank 22 is advanced between the panel cutting mechanism 19 and the cooperating roller 20, it is gripped by laterally spaced rubber annular members 58 which hold the blank as the panel is cut out of the blank by rotation of the panel cutting blade 46. The vacuum within the carrying cylinder 30 is timed so that vacuum is applied within the confines of the blade 46 at the precise time that the blade is in contact with the blank so that the panel cut out is lifted out of the blank. The waste panel is then carried around beneath the feed path and positive pressure is directed into the hollow cylinder 30 to blow the waste material outwardly from the knife into a container (not shown) located below the feed line. After the panel has been cut out of the blank, the blank is delivered to a second conveyor feed system including two spaced chain conveyors 60 and 62 having upstanding aligning pins 64 and 66 which are accurately aligned at right angles to the center line of the feed path of the blank in order to accurately position the blank in alignment with the feed line for operation thereon by other envelope making mechanism (not shown).

In the embodiment illustrated in FIG. 6, a rectangular cutting blade 68 which may be of either continuous or interrupted segmental form, is mounted on a block 70 on a shell member 72 as in the previous embodiment. In the present instance, however, the cutting blade 68 is positioned on a flat ledge 74 of a cut-out portion of the block 70. In this instance the knife edges of the blade 68 are constructed so that they will not deviate from the radial line to any great extent.

In the embodiments illustrated in FIGS. 7 and 8 the cutting blades are made of a plurality of segments such as, two, 74 and 76 as indicated in FIG. 7 and, three, 78, 80 and 82 as indicated in FIG. 8. In order to adjust the segments to achieve the desired width of the panel which will be cut out from the blank the inner edges of the segments 74 and 76 may be cut away as desired. Similarly, in connection with the three piece construction as indicated in FIG. 8 the middle section 80 may be of a length chosen to give the desired envelope blank width.

FIGS. 9 to 13 indicate another embodiment of the invention in which the panel cutting knife is precisely ground to achieve uniform precision cutting of panels from envelope blanks. It should be appreciated that normally when a blank is cut by the panel cutter 46 the anvil backing roller 20 will contact the ends of the panel cutting knife along a point contact area 90 as indicated in FIG. 9 whereas the sides will be contacted along a line contact area 92 as indicated in FIG. 10. An increase in contact area at the sides over the ends of the knife is due to the fact that the panel cutting knife is set with its longitudinal axis offset from the axis of the backing roller of the knife carrying roller 19 and effects a shear cut of the envelope blank. It can be readily appreciated that the sides of the panel cutting knife are subjected to much less force per area of contact than the ends of the knife and hence the sides are less likely to become damaged than the ends.

In accordance with the present invention this is overcome by grinding and mounting the panel cutting knife so that the ends of the knife have more clearance with the backing roller anvil during its rotation than the sides of the knife have therewith. In FIG. 11 there is illustrated a preferred contouring for the panel cutting knife 46 in which the knife is ground along a larger diameter grinding radius which is arranged to intersect the cutting radius of the panel cutting knife 46 at locations 94 and 96, respectively.

The locations 94 and 96 coincide with the locations of the sides of the panel cutting knife 46. The ends of the knife are ground so that they do not extend outwardly a radial distance equal to the radius of cut presented by the sides of the knife. If the backing anvil 20 is left in the position indicated in FIG. 11 the sides of the panel cutting knife at the points illustrated by 94 and 96 would clear the backing roller 20 but would nevertheless cut through a blank advanced therebetween. It should be appreciated that for purposes of illustration the radii are exaggerated as are the thicknesses involved. The drawing in FIG. 11 is made to illustrate that with the backing roller positioned as in FIG. 11 the blank will probably not be cut by the end portions of the panel cutter 46 because the clearance between the tips of the end portions and the backing roller 20 is too great but will be cut through by the side portions thereof. Therefore, it is necessary when the panel cutter is ground along the large radius grinding circle to move the backing anvil 20 downwardly a minute amount so that it will be spaced closely enough to the ends of the anvil to effect cutting of a blank fed therebetween. In this new position the roller 20 is still spaced a sufficient amount from the roller 19 to permit clearance of the sides of the panel cutter 46 but also sufficiently close to effect the cutting of the envelope blank. It should be remembered that it is not necessary that the knife penetrate the complete thickness of a paper blank in order to completely sever it. Unlike a shearing type cut produced by a pair of conventional scissors, cutting of the blank material according to the invention is accomplished by crushing it between the hard surface anvil and a relatively dull but strongly supported blade. Cutting is accomplished by compressing the material to a point of separation through embrittlement of the fibers by pressure alone. A penetration of sixty percent or more of the thickness of the blank will be sufficient to bring about this result. The undercutting or the increased anvil to blade clearance at the ends of the cutter serves to relieve some of the extreme unwanted pressure on the ends to keep this portion of the cutter from going completely through the material and damaging itself and the backing anvil. The offset of the cutter to the axis of its supporting roller gives a progressive point contact at which this crushing effect takes place. Such a panel cutting knife construction insures that a window panel will be cut from each blank as it is advanced therebetween and further insures that the panel cutting knife will not be damaged by excessive pressure which may be applied to any one location thereon as was previously true when the high pressure contact and areas were made to extend radially the same amount as the sides. Each blank which is cut by a panel ground in the above fashion will be cut completely around the periphery of the panel. The ends of the panel cutting knife, being spaced further away from the backing roller 20, will no longer be subjected to the high pressure contact with the blanks as in previous embodiments.

In FIG. 13 there is illustrated the mounting support member 98 which holds the backing anvil roller 20 on a pair of depending stud members 100 and 102. The stud members 100 and 102 are provided with keyways 104, 104 which are guided by a key projection 106 of the support 98 and each is threaded through a nut collar 108 which may be rotated thereon to move the stud members 100 and 102 either upwardly or downwardly in the collar along the keyways 104, 104 in order to adjust the clearance between the backing roller 20 and the panel cutting knife 46.

While specific embodiments of the invention have been shown and described in detail to illustrate the application of the invention principles, it will be understood that the invention may be embodied otherwise without departing from such principles.

What is claimed is:

1. Rotating apparatus for cutting panels from blanks of sheet material comprising a mounting cylinder having an axis of rotation, a pair of shell segments positioned on said mounting cylinder and connected to each other, and mounting block means connected to one of said shells including knife means connected to said mounting block for cutting panels from said blanks, said knife means including side cutting edge portions extending substantially parallel to said mounting cylinder axis of rotation and end cutting edge portions extending substantially transverse to said mounting cylinder axis of rotation, said end cutting edge portions extending outwardly from said cylinder axis of rotation a slightly shorter radial distance than said side cutting edge portions, and an anvil roller cooperating with said knife means and arranged with its outer surface spaced therefrom an amount less than the thickness of the sheet material being cut.

2. Apparatus according to claim 1 wherein said mounting cylinder has a hollow portion and includes passage means communicating from said hollow portion of said mounting cylinder to the interior of said knife means, and means to direct vacuum to said hollow portion of said cylinder whereby to attract a panel cut from a blank by suction at the location of said cutting knife.

3. A rotary panel cutter for cutting panels from blanks of sheet material comprising a central mounting cylinder having an axis of rotation, a pair of cooperating shell members positioned on said cylinder and bolted together, a mounting block bolted to one of said shell members, an oval-shaped cutting knife comprising at least two sections joined to form a substantially rectangular outline, said cuting knife including end blade portions extending generally transverse to the cylinder axis of rotation and elongated side blade portions extending generaly parallel to the cylinder axis of rotation, said side blade portions extending outwardly from said mounting cylinder axis of rotation a greater amount than said end blade portions, whereby said end blade portions are subject to less cutting force than said side blade portions, means to secure said knife to said mounting block and an anvil roller cooperating with said cutting knife and arranged with its outer surface spaced therefrom an amount less than the thickness of the sheet material being cut.

4. A rotary panel cutter according to claim 3 including means for alternately applying a positive and a negative pressure in the center of said panel cutting knife.

5. A rotary panel cutter for cutting sheet material comprising a rotating mounting cylinder, a curvilinear substantially elongated oval-shaped cutting knife mounted on said cylinder and having its longitudinal axis offset in respect to the longitudinal axis of said mounting cylinder, said cutting knife being ground along a curve having a radius of curvature substantially larger than the radius from the center of said mounting cylinder to an edge of said cutting knife whereby the end portions of said cutting knife are slightly undercut in respect to the side elongated portions, and a backing anvil roller cooperating with said cutting knife and arranged with its outer surface spaced from the elongated side cutting edges of said cutting knife an amount less than the thickness of the sheet material being cut whereby complete panels are cut out from the sheet material as it is advanced between said cutting knife and said backing roller anvil and the end portions of said cutting knife are subject to less cutting force than the elongated side portions.

6. A panel cutter according to claim 5, wherein said backing anvil roller may be adjustably positioned in relation to said mounting cylinder whereby to vary the clearance between said backing anvil roller and said cutting knife to accommodate sheet materials of varying thicknesses.

7. A rotary cutter comprising an elongated rotating mounting cylinder, a panel cutter for cutting panels from sheet material positioned on said cylinder, said panel cutter being substantially oval-shaped and having its elongated axis extending lengthwise of said cylinder, the elongated sides of said panel cutter projecting radially outward from the center of said mounting cylinder a slightly greater amount than the ends of said panel cutter and a backing roller cooperating with said panel cutter and having an outer surface spaced minutely from the sides of said panel cutter and being effective upon rotation with said cutter to effect severance of a panel from sheet material advanced therebetween.

8. A rotary panel cutter according to claim 3 wherein said cutting knife comprises at least three sections joined to form a substantially rectangular outline.

9. Rotary apparatus comprising a cylinder having an axis of rotation, and knife means for cutting panels from sheet material mounted thereon, the knife means upon said cylinder being adapted for close peripheral rotation in relation to an adjacent hard surfaced anvil roller, said knife means including side blade portions extending longitudinally of said cylinder axis of rotation, and end blade portions extending transverse to said cylinder axis of rotation, said end blade portions having a radius of curvature larger than their radial distance from the cylinder axis of rotation.

10. Apparatus according to claim 9, wherein the longitudinal axis of said knife means is angularly offset from the axis of rotation of said cylinder.

11. Apparatus according to claim 10, including in addition, conveyor means for advancing envelope blanks into association with said knife means at a skew angle relation corresponding to, and compensating for, the angular offset of said cutter knife.

12. Rotary apparatus for severing sheet material comprising a cylinder having an axis of rotation, knife means mounted on said cylinder, and anvil means rotationally mounted in close peripheral relation to said knife means, said knife means including a first blade portion extending generally parallel to said cylinder axis of rotation and having a predetermined clearance with respect to the surface of said anvil means, and a second blade portion extending generally transverse to said cylinder axis of rotation and having a predetermined clearance with respect to the surface of said anvil means greater than said predetermined clearance of said first blade portion with said anvil means whereby the operating cutting pressures along the cutting edges of each blade portion are maintained substantially uniform.

13. Rotary apparatus for severing sheet material comprising a cylinder having an axis of rotation, knife means mounted upon said cylinder, and anvil means rotationally mounted in close peripheral relation to said knife means, said knife means including a first blade portion extending generally parallel to said cylinder axis in rotation, and a second blade portion extending generally transverse to said cylinder axis of rotation, said second blade portion extending outwardly from said cylinder axis of rotation a slightly shorter radial distance than said first blade portion whereby the operating cutting pressures along the cutting edges of each blade portion are maintained substantially uniform to thereby effect uniform wear thereof.

References Cited in the file of this patent

UNITED STATES PATENTS

| | | |
|---|---|---|
| 378,405 | Snyder | Feb. 21, 1888 |
| 1,111,751 | Kenny | Sept. 29, 1914 |
| 2,095,631 | Cumfer | Oct. 12, 1937 |
| 2,302,855 | Hallman | Nov. 24, 1942 |
| 2,381,955 | Hoffman et al. | Aug. 14, 1945 |
| 2,403,377 | Kelley | July 2, 1946 |
| 2,487,271 | Petri | Nov. 8, 1949 |
| 2,623,746 | Gegenhumer | Dec. 30, 1952 |
| 2,815,077 | Pechy | Dec. 3, 1957 |
| 2,821,390 | Norton | Jan. 28, 1958 |
| 2,895,551 | Anderson | July 21, 1959 |
| 3,011,377 | Monck | Dec. 5, 1961 |

FOREIGN PATENTS

| | | |
|---|---|---|
| 683,058 | Germany | Oct. 28, 1939 |